(12) United States Patent
Morrison et al.

(10) Patent No.: US 7,481,918 B2
(45) Date of Patent: Jan. 27, 2009

(54) VIBRATORY MIXER

(75) Inventors: Ralph L. Morrison, Ashkum, IL (US); Jeffrey Rhodes, Durango, CO (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 0 days.

(21) Appl. No.: 11/407,865

(22) Filed: Apr. 20, 2006

(65) Prior Publication Data

US 2006/0254970 A1  Nov. 16, 2006

Related U.S. Application Data

(60) Provisional application No. 60/674,327, filed on Apr. 22, 2005.

(51) Int. Cl.
*C02F 1/52* (2006.01)
(52) U.S. Cl. ............... 210/96.1; 210/143; 210/192; 210/205; 366/116; 366/127
(58) Field of Classification Search ........... 210/96.1
See application file for complete search history.

(56) References Cited

U.S. PATENT DOCUMENTS

| | | | |
|---|---|---|---|
| 4,013,552 A | 3/1977 | Kreuter | |
| 4,609,402 A | 9/1986 | McMasters | |
| 4,770,704 A | 9/1988 | Gibson et al. | |
| 4,818,304 A | 4/1989 | Verhoeven et al. | |
| 4,894,034 A | 1/1990 | Brown, III | |
| 4,927,334 A | 5/1990 | Engdahl et al. | |
| 5,067,551 A | 11/1991 | Murakami et al. | |
| 5,110,376 A | 5/1992 | Kobayashi et al. | |
| 5,223,046 A | 6/1993 | Kobayashi et al. | |
| 5,336,337 A | 8/1994 | Funayama et al. | |
| 5,472,620 A | 12/1995 | Huang | |
| 5,529,745 A | 6/1996 | Mori et al. | |
| 5,846,433 A | 12/1998 | Sorensen et al. | |
| 5,931,452 A | 8/1999 | Nakatomi et al. | |
| 6,012,521 A | 1/2000 | Zunkel et al. | |
| 6,037,682 A | 3/2000 | Shoop et al. | |
| 6,230,799 B1 | 5/2001 | Slaughter et al. | |
| 6,273,965 B1 | 8/2001 | Pulvirenti et al. | |
| 6,273,966 B1 | 8/2001 | Snodgrass et al. | |
| 6,620,317 B2 | 9/2003 | Alviti | |
| 6,951,616 B2 | 10/2005 | Dahlberg | |
| 7,163,629 B2 * | 1/2007 | Abu-Orf et al. ............ 210/603 |

OTHER PUBLICATIONS

Etrema Products, Inc.—Core Technology—Patents, Product Literature from www.etrema-usa.com , printed Apr. 4, 2006, publication date unknown.

Etrema Products, Inc., Data Sheet, Terfenol-D®, publication date unknown.

Etrema Products, Inc.—Core Technology—What is Terfenol-D®?, Product Literature from www.etrema-usa.com, printed Apr. 4, 2006, publication date unknown.

(Continued)

*Primary Examiner*—Peter A. Hruskoci

(57) ABSTRACT

A treatment system including a vibratory mixer is disclosed. The vibratory mixer comprises a vibrating element to facilitate the dissolution of a treating agent that facilitates separation of solids from liquids in water and wastewater streams. Vibratory mixing energy that effects mixing is generated by utilizing magnetostrictive or piezoelectric materials.

20 Claims, 2 Drawing Sheets

OTHER PUBLICATIONS

Etrema Products, Inc., Data Sheet, Actuator Line Specifications, publication date unknown.

Etrema Products, Inc.—Products—Standard Actuators—Sonic Actuators, Product Literature from www.etrema-usa.com, printed Apr. 4, 2006, publication date unknown.

Etrema Products, Inc.—Products—Standard Actuators—Ultrasonic Actuators, Product Literature from www.etrema-usa.com, printed Apr. 4, 2006, publication date unknown.

Etrema Terfenol-D® Ultrasonic Magnetostrictive Actuators Specifications and Dimensions, Product Literature, publication date unknown.

* cited by examiner

VIBRATORY MIXER

CROSS-REFERENCE TO RELATED APPLICATION

This application claims the benefit under 35 U.S.C. § 119(e) of U.S. Provisional Application No. 60/674,327, entitled VIBRATORY MIXER, filed Apr. 22, 2005.

BACKGROUND OF THE INVENTION

1. Field of the Invention

The present invention relates to mixing techniques and systems effecting such techniques and, in particular, to mixing techniques and apparatuses utilizing vibrating energy to facilitate mixing of treating agents in water and/or treatment systems.

2. Description of Related Art

Water and wastewater treatment systems can utilize unit operations directed to removing or separating undesirable species. Treating agents can be added to the water to be treated that facilitates removal of the undesirable component. Typically, however, the treating agent is supplied in relatively concentrated form and thus requires dilution prior to use. Dilution requires mixing the agent in a solvent. Traditional mixing approaches have involved introducing mechanical energy through with paddles and/or impellers. The treating agents, however, may still not be completely assimilated in the solvent which leads to increased operating costs because inefficient agent utilization.

SUMMARY OF THE INVENTION

In accordance with some aspects of the invention, one or more embodiments thereof involve a water treatment system comprising a separator and a mixer fluidly connected to the separator and to a source of a treating agent. The mixer typically comprises a vibratory element which, in some embodiments of the invention, is a non-rotating element.

In accordance with further aspects of the invention, one or more embodiments thereof involve a method of preparing a mixture comprising introducing solvent and a species into a mixing chamber and actuating a transducer coupled to a non-rotating element configured to introduce vibratory energy into the mixing chamber.

In accordance with still further aspects of the invention, one or more embodiments thereof involve a method of treating water comprising introducing a treating agent into a mixer containing an aqueous solvent, actuating a vibratory element in the mixer to create a treating mixture, and introducing the treating mixture into the water to be treated.

Other advantages and novel features of the invention will become apparent from the following detailed non-limiting description of various embodiments of the invention when considered in conjunction with the accompanying figures.

BRIEF DESCRIPTION OF THE SEVERAL VIEWS OF THE DRAWINGS

Non-limiting embodiments of the present invention will be described by way of example with reference to the accompanying drawings, which are schematic and are not intended to be drawn to scale. In the drawings, each identical or nearly identical component illustrated is typically represented by a single numeral. For purposes of clarity, not every component is labeled in every drawing, nor is every component of each embodiment of the invention shown where illustration is not necessary to allow those ordinarily skilled in the art to understand the invention. In the drawings.

DETAILED DESCRIPTION OF THE INVENTION

Figure 1:
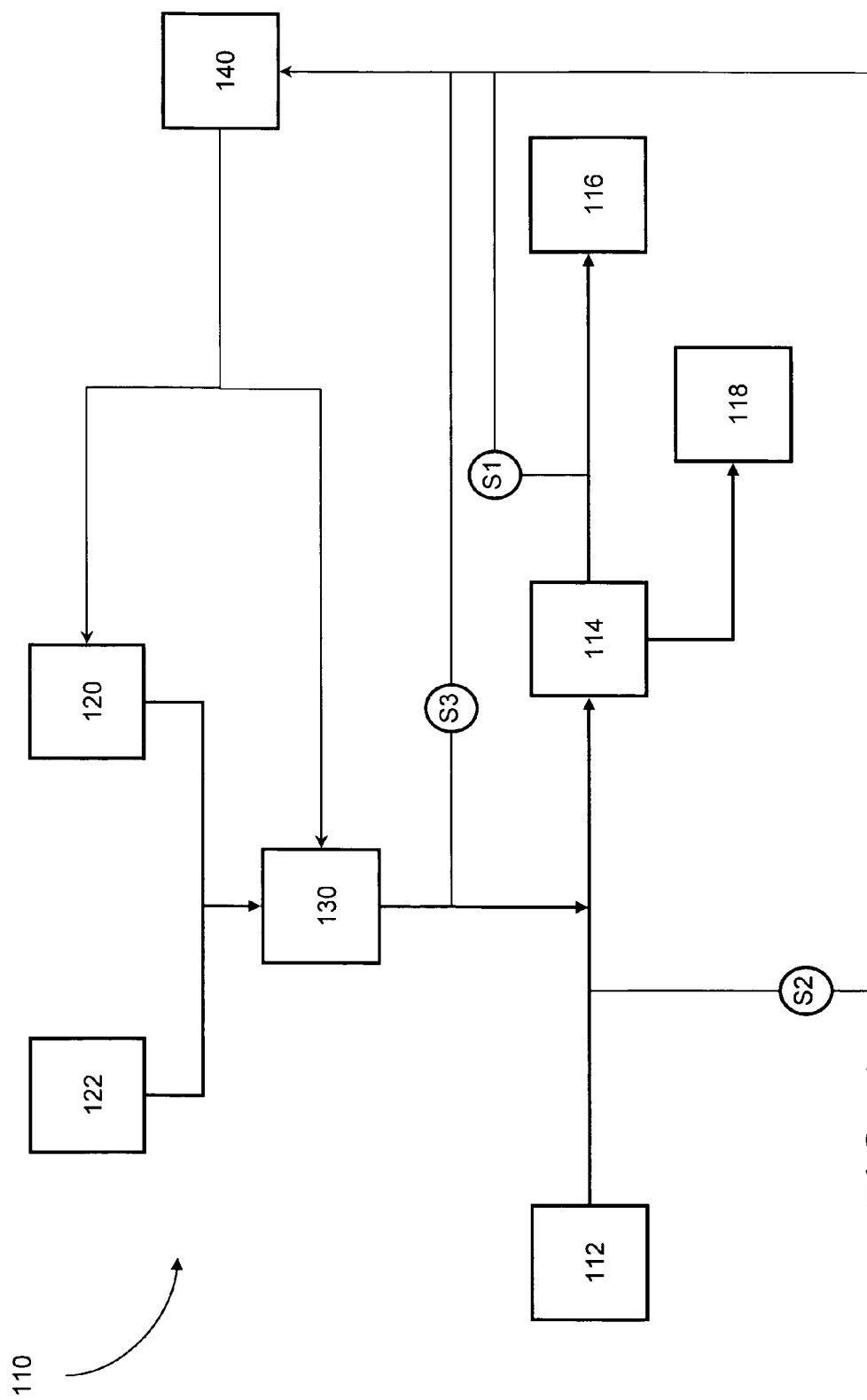
FIG. 1 is a schematic diagram of a system including a mixer or mixing apparatus one or more embodiments of the invention.

U.S. Provisional Application No. 60/674,327, entitled VIBRATORY MIXER, filed Apr. 22, 2005, is incorporated herein by reference in its entirety.

Some aspects of the invention are directed to utilizing sonic energy to induce vibrational energy and effect mixing. Further aspects of the invention can relate to causing fluids to oscillate in a mixing regime by, for example, inducing components, e.g., pipes, of a mixing apparatus to vibrate. The mixing energy can be selected or otherwise tuned based on considerations such as the type of solvent, solute, and concentration of interest. Other considerations pertinent to the directed energy that may be relevant to mixing include, for example, the density, molecular weight, and/or viscosity of one or more solutes and/or one or more solvents. The presence of any suspended solids may also be a consideration.

Some aspects of the invention are directed to water and/or wastewater treating systems. Further aspects of the invention are directed to systems utilizing mixing apparatuses that provide non-rotating shaft energy. Some aspects of the invention can also pertain to methods of assembly and retrofitting existing assemblies, subsystems and/or systems including, for example, water and/or wastewater treatment systems. In some cases, the treatment system comprises a mixer comprising or consisting of a non-rotating vibratory element and essentially disposed in a mixing chamber of the mixer.

The various apparatus, assemblies, and/or systems of the invention may be operated in any suitable fashion that achieves the desired product and/or effects the desired characteristic. For example, the various exemplary embodiments of the invention can be operated continuously, or essentially continuously or continually, intermittently, periodically, or even upon demand to provide at least one product having one or more desired properties.

In aspects of the invention directed to treatment systems, such systems and associated techniques can treat an aqueous system such as water and/or wastewater to provide treated water or wastewater having one or more desired characteristics. In the various embodiments and aspects of the invention described herein, the term "water" refers to water as well as wastewater bodies including streams or flowing fluids thereof. The treatment systems of the invention include one or more various unit operations that effect treatment of an influent or incoming stream to produce at least one effluent having the one or more desired characteristics. Further related aspects thereof can pertain to controlling the operation of the various system or techniques to achieve one or more desirable, or target, characteristics.

One or more aspects of the invention pertain to systems that treat or otherwise remove one or more species from a fluid stream or otherwise modify a fluid stream to have a desired characteristic or property. The influent or liquid to be treated can be provided from any source including, but not limited to, wastewater treatment facilities, water purification facilities, as well as from industrial, commercial, and residential structures or installations.

The embodiment illustrated in FIG. 1 is directed to a treatment system. The treatment system 110 can have at least one source of a fluid to be treated 112 fluidly connected to one or more unit operations, illustrated as separator 114, that can separate or remove one or more components of the fluid from source 112 and provide a treated fluid or effluent to one or more downstream unit operations or points of use 116, or for discharge. One or more separated components can be disposed or delivered to one or more unit operations 118 that can further treat or otherwise modify the separated component, if necessary.

One or more particular aspects of the invention can be directed to water or wastewater treatment systems. In such aspects, separator 114 can effect separation of a solid fraction from a liquid fraction of the water from source 112 to produce one or more liquid-rich streams deliverable to point of use 116. The solid fraction, which is typically considered as solids-rich, can likewise be delivered to one or more downstream unit operations 118 for further processing or for discharge. In accordance with other particular aspects of the invention, treatment system 110 can involve wastewater sludge treatment facilities directed to removing solid sludge from a prior-treated wastewater stream, for example, from a wastewater treatment plant, and produce a recovered water stream delivered to point of use 116.

As illustrated, system 110 further comprises one or more sources of treating agent 120 as well as one or more sources of suitable solvents 122 thereof. Further, system 110 typically comprises one or more mixing apparatuses or mixer 130 disposed to introduce the dissolved treating agent into the fluid to be treated e.g., from source 112. As exemplarily illustrated, mixer 130 can be fluidly connected to treating agent source 120 and to solvent source 122, at an inlet section, and, at an outlet section, to separator 114. Although an outlet stream from mixer 130 is illustrated as fluidly connected to a stream delivered from source of fluid to be treated 112 to separator 114, the invention may involve embodiments wherein treating agent mixture from mixer 130 is delivered directly to source 112, separator 114, or to a unit operation disposed upstream of separator 114 or downstream of source 112. Further embodiments contemplate a plurality of mixing apparatuses 130 disposed to introduce one or more treating agents to the fluid to be treated. Indeed, various embodiments of the invention may involve a plurality of separators 114, each having associated inlet streams of fluid to be treated and each, in turn, having one or more treating agent sources with one or more mixers 130 fluidly connected to the one or more inlet streams.

Some aspects of the invention may involve one or a plurality of sensors as well as one or a plurality of types or kinds of sensors. Sensors that may be utilized in the systems and techniques of the invention can measure or provide, for example, density, flow rate, viscosity, network strength, turbidity, conductivity, pressure, temperature, pH, streaming current, oxidation-reduction potential, and concentration of one or more species, of one or more fluids or components of fluids of system 110. As exemplarily illustrated, system 110 can include one or more sensors S1, S2, and/or S3. Any one or more of these sensors may be disposed or configured to measure or otherwise provide an indication of the operating status or can provide a direct or indirect indication of a characteristic or property of a stream or unit operation in system 110. The sensors may also be disposed to provide an operating condition of any of source 112 and separator 114. For example, sensor S1 can be disposed to be in fluid communication with at least one stream exiting from separator 114. Also exemplarily illustrated, sensor S2 can be disposed to measure at least one characteristic of the stream to be treated from source 112 and sensor S3 can be disposed to measure at least one characteristic of the treating agent mixture from mixer 130. Although not illustrated, other embodiments of the invention may involve one or more sensors measuring various characteristics of, for example, a solids-rich stream exiting separator 114, treating agent from source 120, and/or solvent from source 122.

A process parameter, as used herein, is typically a measured or calculated quantity and can include, for example, pH, temperature, pressure, oxidation-reduction potential, concentration, flow rate, turbidity, viscosity, mass, volume, saturation index, and streaming current. Process parameters can also be intrinsic quantities such as, but not limited to, expansion coefficient, enthalpy, boiling point, freezing point, density, thermal conductivity, and heat capacity.

System 110 can optionally include one or more control systems or controllers 140 that facilitate operating parameters of treatment system 110. Typically, controller 140 is configured to receive at least one indication of a characteristic of treatment system 110 and preferably, further react or provide an appropriate response to the measured characteristic. For example, a characteristic of the liquid-rich stream exiting separator 114 can be measured by sensor S1. The measured characteristic can be transmitted to controller 140 which, if necessary, generates a corresponding signal according to a control scheme. The control signal is typically transmitted to one or more unit operations of treatment system 110 to adjust one or more operating conditions thereof. As illustrated in FIG. 1, one or more sensors may be utilized with controller 140 and generate one or more signals or responses to one or more unit operations. The control loop may utilize any conventional control technique including, for example, proportional, integral, and derivative schemes as well as combinations thereof. The illustrated control scheme can be considered as a conventional negative feedback arrangement. The invention may also be practiced to involve other control configurations. For example, the control technique may incorporate adaptive methods that involve machine learning with or without statistical analysis, expert systems that apply reasoning capabilities to reach a conclusion, case-based reasoning, Bayesian networks, and/or behavior-based methods; and/or computational intelligence that involve iterative development or learning, e.g., parameter tuning that implicate neural networks or systems with predominant pattern recognition capabilities, fuzzy systems or techniques for reasoning under uncertainty, and evolutionary computational schemes that, for example, mimic biological behavior to generate increasingly stable control solutions.

In one embodiment, the system can be directed to a wastewater treatment system comprising a mixer connected to a source of a treating agent and comprising a non-rotatable vibratory element constructed and arranged to create sonic energy in a mixing chamber of the mixer to produce a treating agent mixture. The wastewater treatment system can also comprise a separator in fluid communication downstream from the mixer and a source of wastewater, and a controller configured to induce vibration of the vibratory element at one or a plurality of frequencies. The mixer can include an outlet connected to a source of wastewater downstream from the source of wastewater and the mixer. The wastewater treatment system may further comprise a sensor in fluid communication with an outlet of the separator and disposed to measure at least one characteristic of a liquid-rich stream discharged from the separator. In certain examples, the controller can be configured to modulate the frequency of the vibratory element based at least partially on at least one characteristic of the liquid-rich stream.

Controller 140 may be implemented using one or more computer systems which may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for water treatment system.

The computer system can include one or more processors typically connected to one or more memory devices, which can comprise, for example, any one or more of a disk drive memory, a flash memory device, a RAM memory device, or other device for storing data. The memory component is typically used for storing programs and data during operation of the system 110 and/or the computer system. For example, memory may be used for storing historical data relating to the parameters of the water over a period of time, as well as current sensor measurement data. Software, including programming code that implements embodiments of the invention, can be stored on a computer readable and/or writeable nonvolatile recording medium, and then typically copied into one or more memory components wherein it can then be executed by the one or more processors. Such programming code may be written in any of a plurality of programming languages, for example, Java, Visual Basic, C, C#, or C++, Fortran, Pascal, Eiffel, Basic, COBAL, or any of a variety of combinations thereof.

The components of the computer system may be coupled by an interconnection mechanism, which may include one or more busses (e.g., between components that are integrated within a same device) and/or a network (e.g., between components that reside on separate discrete devices). The interconnection mechanism typically enables communications (e.g., data, instructions) to be exchanged between components of system.

The computer system can optionally include one or more input devices, for example, a keyboard, mouse, trackball, microphone, touch screen, and one or more output devices, for example, a printing device, display screen, or speaker. In addition, the computer system may also optionally have one or more interfaces that can connect the computer system to one or more communication networks (in addition or as an alternative to the network that may be formed by one or more of the components of system).

According to one or more embodiments of the invention, the one or more input devices may include sensors for measuring parameters of the incoming and treated streams such as one or more of sensors S1, S2, and/or S3, and the one or more output devices may include one or more components, such as metering valves and/or pumps of, for example, source subsystems 120 and/or mixer 130. Alternatively, the sensors, the metering valves and/or pumps, or all of these components may be connected to a communication network that is operatively coupled to computer system. For example, sensors S1 and S2 may be configured as input devices that are directly connected to controller 140, metering valves and/or pumps of subsystem 120 may be configured as output devices that are connected to controller 140, and any one or more of the above may be coupled to another computer system or component so as to communicate with one or more computer systems of controller 140 over a communication network. Such a configuration permits one sensor to be located at a significant distance from another sensor or allow any sensor to be located at a significant distance from any subsystem and/or the controller, while still providing data therebetween.

Controller 140 can include one or more computer storage media such as readable and/or writeable nonvolatile recording medium in which signals can be stored that define a program to be executed by one or more processors of the controller. The computer-readable medium may, for example, be a disk or flash memory. In typical operation, one or more processors can cause data to be read from the storage medium into a memory component that allows for faster access to the information by the one or more processors than does the medium. Memory is typically implemented as volatile, random access memory such as a dynamic random access memory (DRAM) or static memory (SRAM) or other suitable devices that facilitates information transfer to and from the one or more processors.

It should be appreciated that the invention is not limited to being implemented in software, or on the computer system. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 140 can be performed in separate computers, each of which can be in communication through one or more networks.

Separator 114 can be, for example, one or more unit operations that rely on the differences in component density or size to effect separation. Non-limiting examples of apparatuses that may be utilized in various embodiments of the invention and rely on the density separating principles include clarifiers and centrifuges; and non-limiting examples of apparatuses that may be utilized in various embodiments of the invention and rely on size separating principles include filters such as belt presses, belt filters, filter presses, and plate-and-frame filters.

Figure 2:
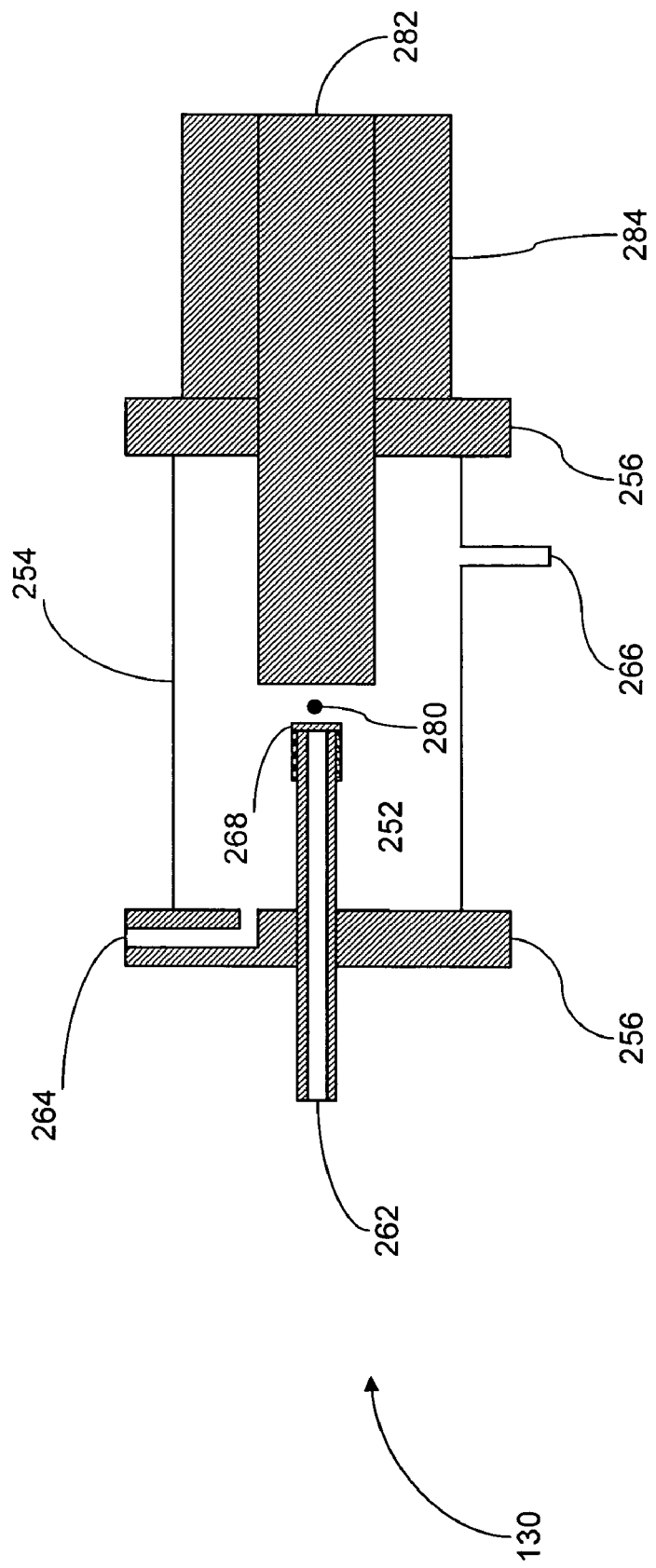
FIG. 2 is a diagram of a mixing apparatus in accordance with one or more embodiments of the invention.

Mixer 130 is further represented in the embodiment illustrated in FIG. 2. Mixer 130 can effect mixing by utilizing one or more non-rotating components to deliver energy to the components to be mixed. The mixture is typically made in a mixing chamber of the mixer. As exemplarily illustrated, mixer 130 can have a first inlet port connectable to a source of a first component to be mixed and a second inlet port connectable to a source of a second component to be mixed. The mixer can provide a mixture of the components as the mixture exits through one or more outlets. As illustrated, mixing chamber 252 is defined by, for example, a cylindrical wall 254 and end blocks 256. A first inlet 262 can be fluidly connected to the source of treating agent 120 and a second inlet 264 can be fluidly connected to the source of solvent 122. Although the mixer is illustrated as having two inlet ports, the components to be mixed may be introduced into the mixer through one inlet port. Thus, one or more components to be mixed may be introduced through inlet 262 and/or one or more other components to be mixed may optionally be introduced through inlet 264. Mixer 130 further comprises one or more components that provide mixing energy into the mixing chamber to facilitate dissolution of, for example, the treating agent into the solvent. In accordance with some embodiments of the invention, as illustrated in FIG. 2, the one or more components that provides mixing energy is directly disposed in chamber 252. Such configurations can advantageously provide mixing energy as the one or more components is introduced into the solvent with improved delivery efficiency. Some embodiments of the invention can thus involve configurations wherein mixing energy is concentrated or particularly delivered to a region 280 by component 282. Region 280 is typically a portion of mixing chamber 252 at which a species to be dissolved has a high concentration, e.g., relative to the concentration in the mixture exiting through outlet 266 or even at a region of chamber 252 at which the solvent is introduced through inlet 264.

Also illustrated is optional cap or valve 268 disposed at an end of inlet port 262. Valve 268 can serve to regulate a rate of flow of, for example, the concentrated treating agent to be dissolved into region 280 and/or to prevent reverse flow of the mixture in chamber 252 through inlet 262. Valve 268 may also be configured to facilitate distribution of the species to be dissolved into region 280. As exemplarily shown, valve 268 is spring-loaded and actuatable into the open position when, inter alia, the pressure of the material introduced through inlet 262 overcomes the forces associated with the spring assembly and any reactive pressure exerted by the fluid in chamber 252.

Mixing energy, in accordance with some embodiments of the invention, mixing energy is vibrational and delivered through a non-rotating element 282. As used herein, the terms "vibratory" and "vibrational" refer to the type of energy delivered by a component, assembly, and/or system of the invention. Vibratory element 282 can be a horn driven by an electrical, magnetic, or electromagnetic field provided by, for example, field generator or actuator 284.

In accordance with some embodiments of the invention, the vibrating component can induce pressure fluctuations that effect mixing especially at region 280. Horn 282 can be actuated to vibrate at any desired frequency that provides the desired mixing effect. Indeed, transducer or actuator 284, or a power source thereof, can be operatively coupled to controller 140 to induce vibration of the vibratory element at one or a plurality of frequencies. For example, a magnetic field directed at vibratory element 282, comprising ferromagnetic material, can induce a strain. When the applied field is varied, the associated expansions can induce vibrational behavior at a particular frequency, e.g., 2500 Hz or 15 KHz, or in a range from about 1000 Hz to 20 KHz, depending on the field variations. Examples of ferromagnetic materials that can be utilized in some embodiments of the invention include those that exhibit magnetostriction characteristics.

Examples of vibratory elements or assemblies that can be actuated by an applied field include assemblies that are commercially available from, for example, ETREMA Products, Inc., Ames, Iowa, as TERFENOL-D® alloy. Vibratory elements or assemblies that may provide the vibratory mixing effect can also utilize piezoelectric materials that exhibit a displacement in response to an applied electric field.

The concentration of the dissolved species, such as the treating agent, in the solution or mixture can vary as desired. For example, the treating agent can comprise a polymeric material diluted in water to a concentration therein of less than about 1 wt %, such as at about 0.25 wt %, about 50 wt %, or 0.75 wt %.

Any treating agent may be utilized in the systems and techniques of the invention pertinent to aspects thereof involving water and/or wastewater treatment. Such treating agents typically facilitate separation of solid material from the liquid phase of the water or wastewater. Non-limiting examples of such agents include those considered as coagulating agents and flocculating agents. Examples of treating agents include those commercially available as CIBA® ZETAG® line of polyelectrolyte coagulants, e.g., CIBA® ZETAG® 7867, and the CIBA® MAGNAFLOC® polymeric flocculant, e.g., CIBA® MAGNAFLOC® 110L, available from CIBA Specialty Chemicals, Suffolk, Va.

Further aspects of the invention can be directed to utilizing induced vibratory energy, e.g., sonic energy to augment disinfection. For example, sonic energy can be employed to disrupt protective mechanisms of microorganism in water to be treated. As such, some embodiments of the invention may involve vibratory apparatus operating at the disinfecting conditions in line with water or wastewater streams to be treated.

EXAMPLE

Non-limiting examples of modes of operation of certain apparatuses and/or systems of the invention are now described. The following examples are intended to illustrate certain aspects of certain embodiments of the invention, but do not exemplify the full scope of the invention.

This example illustrates a mixer in accordance with some embodiments of the invention. The mixer, substantially described above and illustrated in FIG. 2, had an horn/actuator of TERFENOL-D® alloy from ETREMA Products Inc. The mixer had a circular cylindrical horn 282 with a radius of about 1.9 cm (about 0.75 inches). An acrylic cylinder 254 was used in the mixer to define the mixing chamber. Water was metered through a variable area flowmeter. A flocculant was introduced utilizing an annular discharging check valve to assist in dispersing the flocculant to maximize the region of introducing the flocculant exposed to the water.

Water was introduced into the mixing chamber through inlet port 264 at a rate of about 30 USPGH before energizing the actuator assembly. Polymer, i.e., treating agent, CIBA® MAGNAFLOC® 110L flocculant was introduced through inlet port 262, to achieve approximately 0.25% to 0.50% by weight solution. The resultant mixture was observed to have "fish-eye" bodies constituting unmixed polymer material.

The actuator assembly 282/284 was then energized to operate at a frequency of about 2500 Hz. The resultant mixture was observed to have less "fish-eye" bodies relative to the mixture from the non-energized mixer.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only, optionally including elements other than B; in another embodiment, to B only, optionally including elements other than A; in yet another embodiment, to both A and B, optionally including other elements.

As used herein in the specification and in the claims, the term "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives, i.e., "one or the other but not both," when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, the phrase "at least one of A and B" or, equivalently, "at least one of A or B," or, equivalently "at least one of A and/or B" can refer, in one embodiment, to at least one, optionally including more than one, A, with no B present, and optionally including elements other than B; in another embodiment, to at least one, optionally including more than one, B, with no A present, and optionally including elements other than A; in yet another embodiment, to at least one, optionally including more than one, A, and at least one, optionally including more than one, B, and optionally including other elements.

It should also be understood that, unless clearly indicated to the contrary, in any methods claimed herein that include more than one act, the order of the acts of the method is not necessarily limited to the order in which the acts of the method are recited.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases. The phrase "consisting essentially of," when used in the claims, shall have its ordinary meaning as used in the field of patent law.

What is claimed is:

1. A water treatment system comprising:
   a separator fluidly connected to a source of water to be treated; and
   a mixer fluidly connected to a source of a treating agent and a source of a solvent, the mixer comprising a non-rotatable vibratory element comprising one of a piezoelectric material and a magnetostrictive material, and an outlet fluidly connected to the source of water downstream from the source of water to be treated and the mixer and upstream of the separator.

2. The treatment system of claim 1, wherein the mixer further comprises a transducer disposed to apply a field that configurationally changes the vibratory element.

3. The treatment system of claim 2, wherein the vibratory element comprises a magnetostrictive material.

4. The treatment system of claim 1, wherein the treating agent comprises at least one of a flocculant and a coagulant.

5. The treatment system of claim 4, wherein the separator comprises at least one of a clarifier, a filter press, a centrifuge, a plate-and-frame filter, and a belt press.

6. The treatment system of claim 5, further comprising a sensor in fluid communication with a liquid outlet of the separator and disposed to measure at least one characteristic of a liquid stream discharged from the separator.

7. The treatment system of claim 6, further comprising a controller in communication with the sensor and configured to regulate a rate of flow of the treating agent introduced into the mixer.

8. The treatment system of claim 1, further comprising a sensor in fluid communication with an outlet of the separator and disposed to measure at least one characteristic of a liquid-rich stream discharged from the separator.

9. The treatment system of claim 1, wherein the vibratory element of the mixer is configured to deliver mixing energy to a mixing chamber of the mixer after the treating agent has been disposed into the mixing chamber.

10. The treatment system of claim 1, wherein the vibratory element is constructed and arranged to deliver vibrational energy with a frequency of less than 20 kHz.

11. The water treatment system of claim 1, wherein a concentration of a treating agent in a treating agent mixture from the outlet of the mixer is in a range between about 0.25 wt % to about 0.75 wt %.

12. A wastewater treatment system comprising:
   a mixer connected to a source of a treating agent and comprising a non-rotatable vibratory element constructed and arranged to create sonic energy in a mixing chamber of the mixer to produce a treating agent mixture;
   a separator in fluid communication downstream from the mixer and a source of wastewater, the mixer including an outlet connected to a source of wastewater downstream from the source of wastewater and the mixer; and
   a controller configured to induce vibration of the vibratory element at one or a plurality of frequencies.

13. The wastewater treatment system of claim 12, further comprising a sensor in fluid communication with an outlet of the separator and disposed to measure at least one characteristic of a liquid-rich stream discharged from the separator.

14. The wastewater treatment system of claim 13, wherein the controller is further configured to regulate the flow of the treating agent based at least partially on at least one characteristic of the liquid-rich stream.

15. The wastewater treatment system of claim 13, further comprising a second sensor in fluid communication with the treating agent mixture and configured to provide a measured characteristic of the treating agent mixture to the controller.

16. The wastewater treatment system of claim 13, wherein the controller is configured to modulate the frequency of the vibratory element based at least partially on at least one characteristic of the liquid-rich stream.

17. A water treatment system comprising:
a separator fluidly connected to a source of water to be treated; and
a mixer comprising a vibratory element comprising one of a piezoelectric material and a magnetostrictive material operatively coupled to an actuator, a first inlet port with a valve fluidly connected to a treating agent source and disposed at an end of the first inlet port in the mixer, a second inlet port fluidly connected to a solvent source, and an outlet fluidly connected to a stream from the source of water to be treated being delivered to the separator.

18. The water treatment system of claim 17, wherein the valve comprises a spring loaded cap.

19. The water treatment system of claim 18, further comprising at least one sensor disposed to measure at least one of at least one characteristic of a treating agent mixture from the mixer, at least one characteristic of the stream from the source of water to be treated, and at least one characteristic of a liquid-rich stream exiting from the separator.

20. The water treatment system of claim 19, further comprising a controller operatively coupled to at least one of the actuator and the source of treating agent and to the at least one sensor.

* * * * *